US012579357B2

(12) United States Patent
Van et al.

(10) Patent No.: US 12,579,357 B2
(45) Date of Patent: Mar. 17, 2026

(54) SYSTEM FOR LABELING A DATA SET

(71) Applicant: TOYOTA RESEARCH INSTITUTE, INC., Los Altos, CA (US)

(72) Inventors: Monica PhuongThao Van, Palo Alto, CA (US); Yin-Ying Chen, San Jose, CA (US); Kenton Michael Lyons, Los Altos, CA (US); Francine Chen, Los Altos, CA (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 666 days.

(21) Appl. No.: 17/943,101

(22) Filed: Sep. 12, 2022

(65) Prior Publication Data

US 2024/0086618 A1     Mar. 14, 2024

(51) Int. Cl.
G06F 40/40 (2020.01)
G06F 40/117 (2020.01)
(Continued)

(52) U.S. Cl.
CPC ............ G06F 40/117 (2020.01); G06F 40/40 (2020.01); G06F 16/3344 (2019.01);
(Continued)

(58) Field of Classification Search
CPC . G06F 16/3344; G06F 18/2155; G06N 20/00; G06V 20/70
See application file for complete search history.

(56) References Cited

U.S. PATENT DOCUMENTS

| 8,885,277 B1 | 11/2014 | Erden et al. |
| 2002/0136136 A1 | 9/2002 | Gelbart |

(Continued)

FOREIGN PATENT DOCUMENTS

| CN | 105844335 A | 4/2018 |
| CN | 110831029 A | 6/2021 |

(Continued)

OTHER PUBLICATIONS

Linde, et al. "An Algorithm for Vector Quantizer Design," IEEE Transactions on Communications, Jan. 1980. (Year: 1980).*

(Continued)

*Primary Examiner* — Feng-Tzer Tzeng
(74) *Attorney, Agent, or Firm* — Seyfarth Shaw LLP

(57) ABSTRACT

A method for labeling a data set by a coding model includes generating multiple sets of related initial labels based on processing a data set with a group of initial labels. The method also includes determining a quantity of occurrences, within the data set, of each one of the group of initial labels and each related initial label of the multiple sets of related initial labels. The method further includes determining, for each initial label of the group of initial labels, a breadth score based on the number of occurrences of each related initial label. The method still further includes updating one or more of the group of initial labels based on respective breadth scores satisfying a label updating condition. The method also includes labeling the data set based on the group of initial labels and the multiple sets of related initial labels.

20 Claims, 5 Drawing Sheets

(51) Int. Cl.

| | |
|---|---|
| *G06F 16/334* | (2025.01) |
| *G06F 18/214* | (2023.01) |
| *G06N 20/00* | (2019.01) |
| *G06V 20/70* | (2022.01) |

(52) U.S. Cl.

CPC .......... *G06F 18/2155* (2023.01); *G06N 20/00* (2019.01); *G06V 20/70* (2022.01)

(56) References Cited

U.S. PATENT DOCUMENTS

| | | | | |
|---|---|---|---|---|
| 2015/0142708 A1* | 5/2015 | Jing | ....................... | G06V 20/70 |
| | | | | 706/12 |
| 2020/0184270 A1* | 6/2020 | Omer | ..................... | G06V 20/52 |
| 2022/0147879 A1* | 5/2022 | Rowan | ................... | G06N 20/00 |

FOREIGN PATENT DOCUMENTS

| | | | |
|---|---|---|---|
| CN | 113204556 A | | 8/2021 |
| CN | 113672693 A | * | 11/2021 |
| KR | 20190111643 A | | 10/2019 |

OTHER PUBLICATIONS

Linde, et al. "An Algorithm for Vector Quantizer Design," IEEE Transactions on Communications, Jan. 1980 (see attached reference in the previous Office action). (Year: 1980).*

Kanayama, et al., "Using deep learning methods to automate collaborative learning process coding based on multi-dimensional coding scheme", The Tenth International Conference on Mobile, Hybrid, and On-line Learning, Mar. 25-29, 2018.

Crowston, et al., "Machine learning and rule-based automated coding of qualitative data", Proceedings of the American Society for Information Science and Technology 47(1):1-2, Nov. 2010.

\* cited by examiner

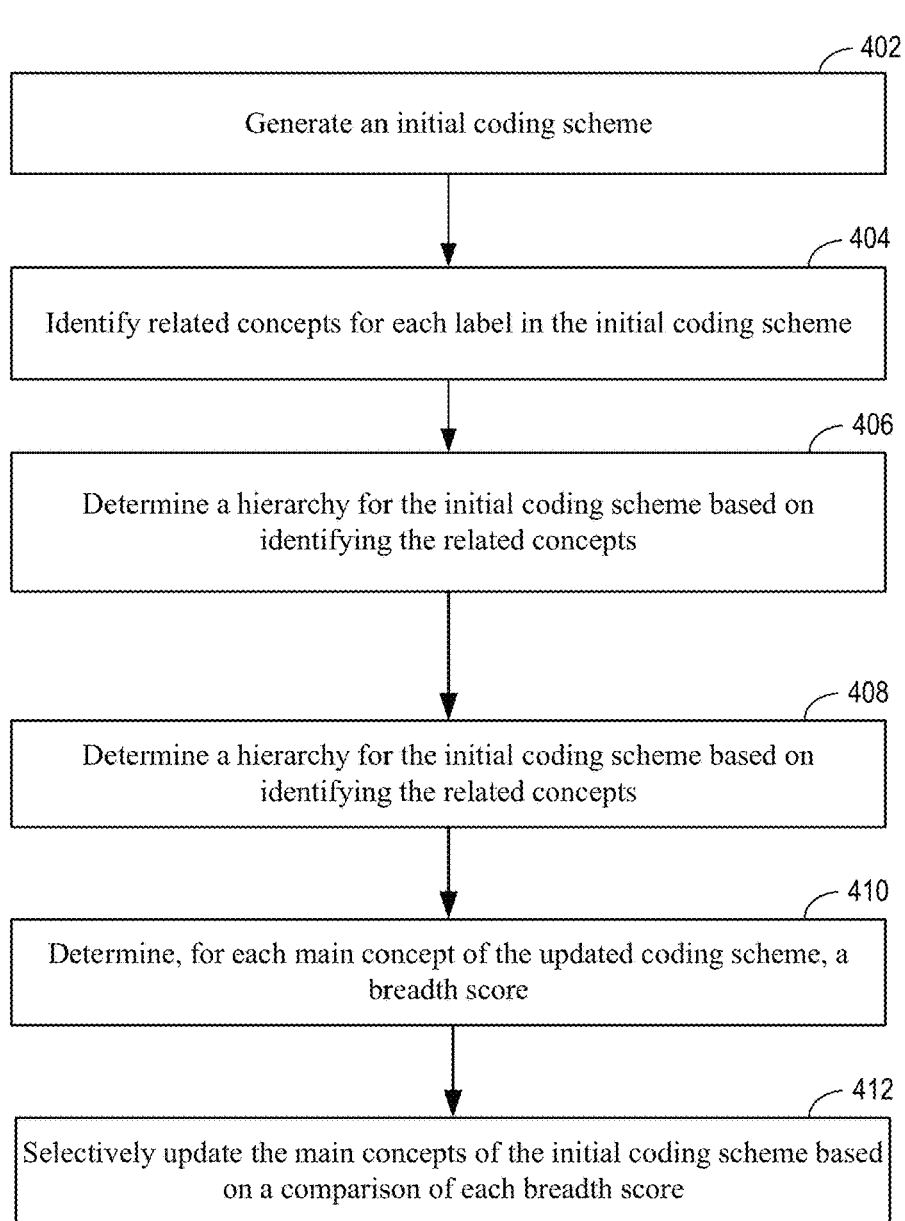

400

402

Generate an initial coding scheme

404

Identify related concepts for each label in the initial coding scheme

406

Determine a hierarchy for the initial coding scheme based on identifying the related concepts

408

Determine a hierarchy for the initial coding scheme based on identifying the related concepts

410

Determine, for each main concept of the updated coding scheme, a breadth score

412

Selectively update the main concepts of the initial coding scheme based on a comparison of each breadth score

*FIG. 4*

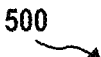

500

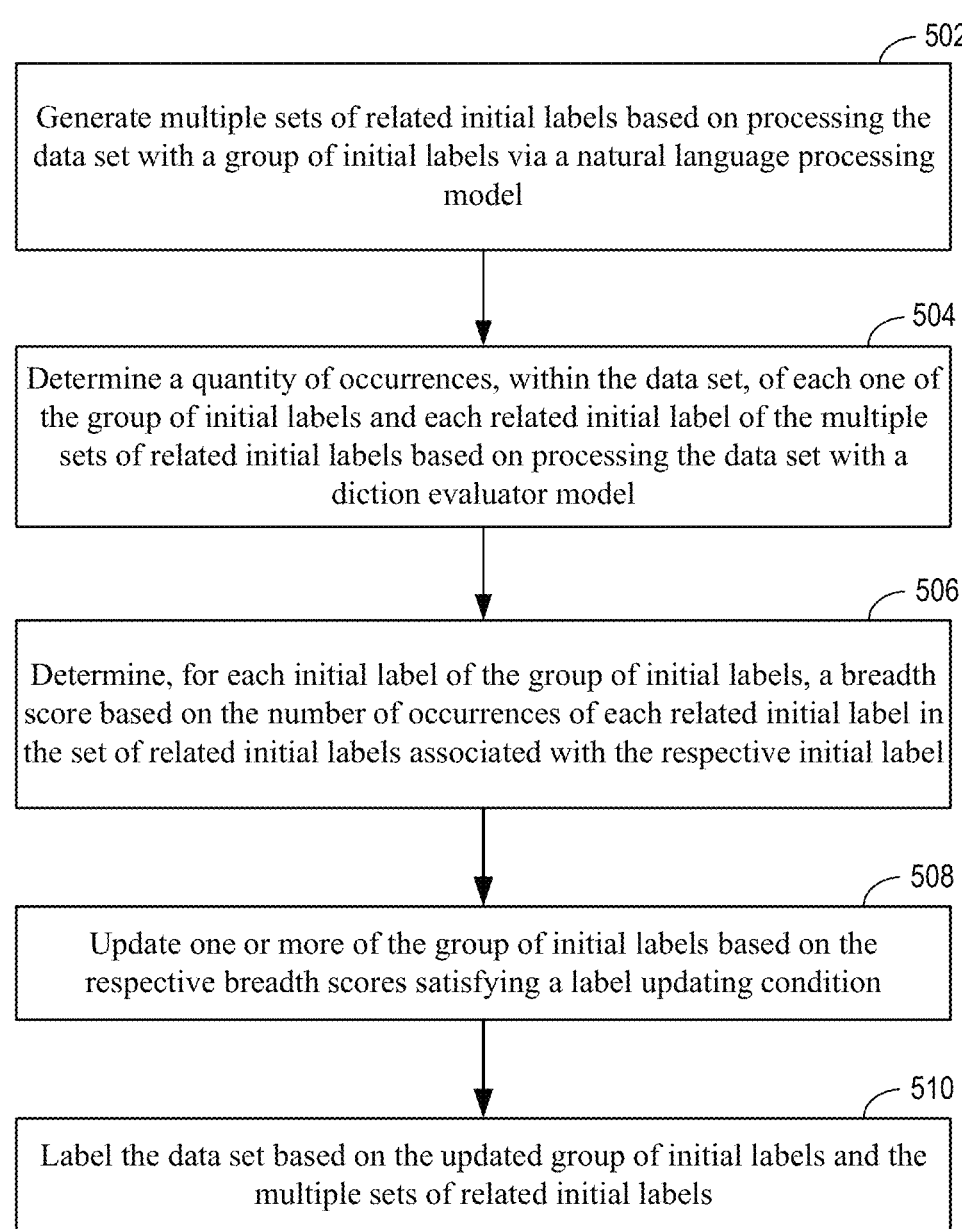

502

Generate multiple sets of related initial labels based on processing the data set with a group of initial labels via a natural language processing model

504

Determine a quantity of occurrences, within the data set, of each one of the group of initial labels and each related initial label of the multiple sets of related initial labels based on processing the data set with a diction evaluator model

506

Determine, for each initial label of the group of initial labels, a breadth score based on the number of occurrences of each related initial label in the set of related initial labels associated with the respective initial label

508

Update one or more of the group of initial labels based on the respective breadth scores satisfying a label updating condition

510

Label the data set based on the updated group of initial labels and the multiple sets of related initial labels

*FIG. 5*

SYSTEM FOR LABELING A DATA SET

BACKGROUND

Field

Certain aspects of the present disclosure generally relate to labeling data sets, and more specifically to generating coding schemes for labeling data sets.

Background

Coding is the analytic task of assigning codes to data. Researchers often use coding in, at least, qualitative analysis and text mining. To keep data organized during the coding process, researchers may use coding schemes. Coding schemes are sets of labels that researchers often curate in order to tag textual responses for the purpose of highlighting prevalent themes within a data set of responses. By highlighting these prevalent themes within a data set of responses, a coding scheme categorizes a data segment by one or more topics.

Traditionally, researchers will develop a coding scheme before coding a data set. The coding scheme may then undergo refinement throughout the coding process. This refinement may involve adding or subtracting labels to the coding scheme. Refinement may also involve splitting a label apart into two or more separate labels or grouping two or more labels together into one label. Although researchers may refine coding schemes with different goals in mind, the general purpose of the refinement process is to create a coding scheme that comprehensively represents a data set.

SUMMARY

In one aspect of the present disclosure, a method for labeling a data set by a coding model includes generating multiple sets of related initial labels based on processing the data set with a group of initial labels via a natural language processing model, each set of related initial labels from the multiple sets of related initial labels being associated with a respective initial label of the group of initial labels. The method further includes determining a quantity of occurrences, within the data set, of each one of the group of initial labels and each related initial label of the multiple sets of related initial labels based on processing the data set with a diction evaluator model. The method still further includes determining, for each initial label of the group of initial labels, a breadth score based on the number of occurrences of each related initial label in the set of related initial labels associated with the respective initial label. The method also includes updating one or more of the group of initial labels based on the respective breadth scores satisfying a label updating condition. The method further includes labeling the data set based on the updated group of initial labels and the multiple sets of related initial labels.

Another aspect of the present disclosure is directed to an apparatus including means for generating multiple sets of related initial labels based on processing the data set with a group of initial labels via a natural language processing model, each set of related initial labels from the multiple sets of related initial labels being associated with a respective initial label of the group of initial labels. The apparatus further includes means for determining a quantity of occurrences, within the data set, of each one of the group of initial labels and each related initial label of the multiple sets of related initial labels based on processing the data set with a diction evaluator model. The apparatus still further includes means for determining, for each initial label of the group of initial labels, a breadth score based on the number of occurrences of each related initial label in the set of related initial labels associated with the respective initial label. The apparatus also includes means for updating one or more of the group of initial labels based on the respective breadth scores satisfying a label updating condition. The apparatus further includes means for labeling the data set based on the updated group of initial labels and the multiple sets of related initial labels.

In another aspect of the present disclosure, a non-transitory computer-readable medium with non-transitory program code recorded thereon is disclosed. The program code is executed by a processor and includes program code to generate multiple sets of related initial labels based on processing the data set with a group of initial labels via a natural language processing model, each set of related initial labels from the multiple sets of related initial labels being associated with a respective initial label of the group of initial labels. The program code further includes program code to determine a quantity of occurrences, within the data set, of each one of the group of initial labels and each related initial label of the multiple sets of related initial labels based on processing the data set with a diction evaluator model. The program code still further includes program code to determine, for each initial label of the group of initial labels, a breadth score based on the number of occurrences of each related initial label in the set of related initial labels associated with the respective initial label. The program code also includes program code to update one or more of the group of initial labels based on the respective breadth scores satisfying a label updating condition. The program code further includes program code to label the data set based on the updated group of initial labels and the multiple sets of related initial labels.

Another aspect of the present disclosure an apparatus including a processor, and a memory coupled with the processor and storing instructions operable, when executed by the processor, to cause the apparatus to generate multiple sets of related initial labels based on processing the data set with a group of initial labels via a natural language processing model, each set of related initial labels from the multiple sets of related initial labels being associated with a respective initial label of the group of initial labels. Execution of the instructions also cause the apparatus to determine a quantity of occurrences, within the data set, of each one of the group of initial labels and each related initial label of the multiple sets of related initial labels based on processing the data set with a diction evaluator model. Execution of the instructions further cause the apparatus to determine, for each initial label of the group of initial labels, a breadth score based on the number of occurrences of each related initial label in the set of related initial labels associated with the respective initial label. Execution of the instructions still further cause the apparatus to update one or more of the group of initial labels based on the respective breadth scores satisfying a label updating condition. Execution of the instructions also cause the apparatus to label the data set based on the updated group of initial labels and the multiple sets of related initial labels.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 4 is a flow diagram illustrating an example of a process for generating a coding scheme by a labeling system, in accordance with various aspects of the present disclosure.

FIG. 5 is a flow diagram illustrating an example of a process for labeling a data set by a labeling system, in accordance with various aspects of the present disclosure.

DETAILED DESCRIPTION

Figure 1:
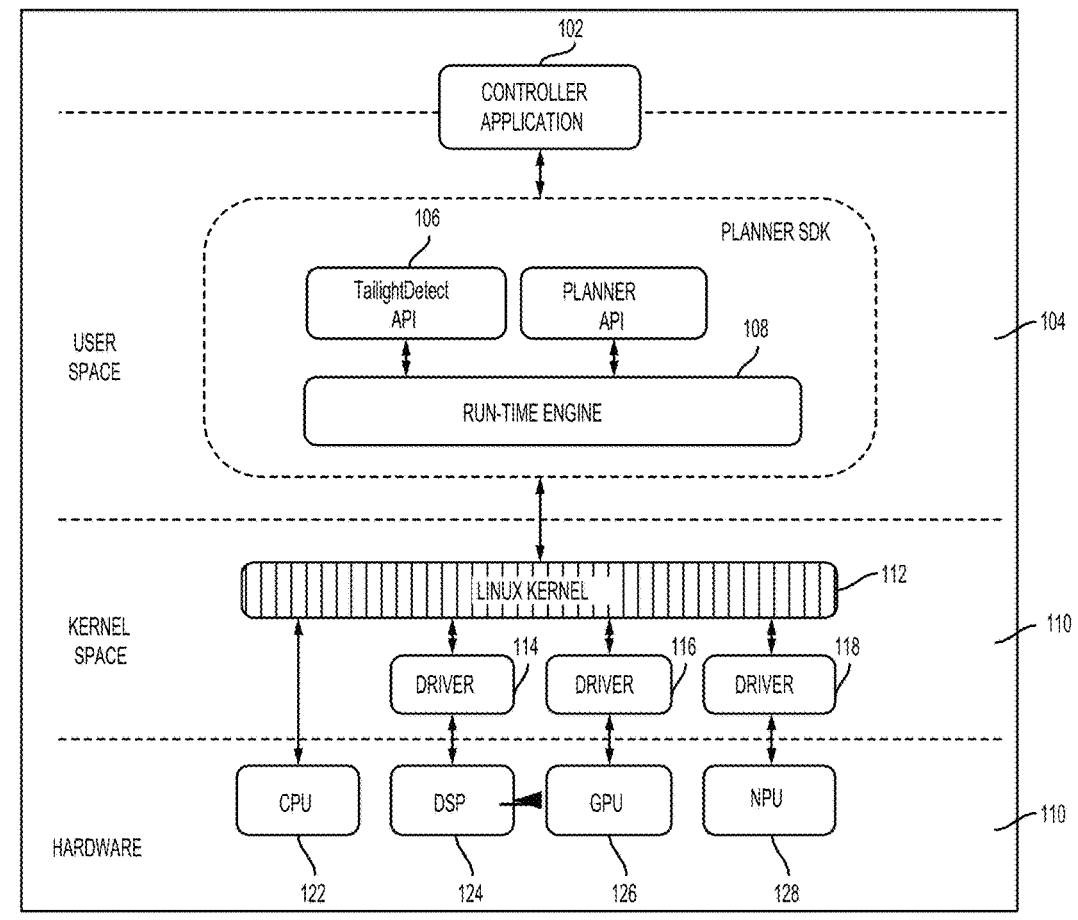
FIG. 1 is a block diagram illustrating a software architecture that may modularize artificial intelligence (AI) functions for planning and control of an autonomous agent, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

As discussed, labeling is an example of assigning one or more labels to data. Labels may also be referred to as codes. The labels may be assigned based on a coding scheme. In some examples, the coding scheme set may be used for labeling data in, at least, qualitative analysis and/or text mining. The assignment of a label to data may be referred to as tagging the data. The coding scheme may include a set of labels that may be curated for tagging the data to identify prevalent themes. The data may be categorized based on the prevalent themes that are identified based on the coding scheme.

In some examples, the coding scheme may be developed before the data is labeled. In some such examples, the coding scheme may be developed by a researcher. In other such examples, the coding scheme may be developed by a trained machine learning model (e.g., an artificial intelligence model). The coding scheme may be refined throughout the coding process. This refinement may include adding or deleting one or more labels from the coding scheme. The refinement may also include dividing a label into two or more separate labels or combining two or more labels together into one label. The coding schemes may be refined to improve the accuracy of the coding scheme. That is, the coding scheme may be improved to more accurately represent the data. The data may also be referred to as a data set.

In some examples, the coding scheme may include one or more labels that are broad or narrow with respect to the concepts that are to be encoded. As an example, labels may be broad if an amount of concepts encoded within the data set is less than a threshold. The labels may be narrow if, for example, underlying concepts between the labels overlap. A coding scheme with narrow labels and/or broad labels may fail to accurately represent a data set.

Various aspects of the present disclosure are directed to analyzing and updating a coding scheme. Some aspects more specifically relate to a system for utilizing natural language processing to analyze and update the coding scheme. The system may calculate the conceptual breadth, conceptual density, conceptual overlap, and/or conceptual space of the labels within the coding scheme. The system may use the conceptual breadth, conceptual density, conceptual overlap, and/or conceptual space to suggest changes to the coding scheme, make changes to the coding scheme, and/or generate a new coding scheme. In some examples, the natural language processing recognizes patterns and relationships within the data set or coding scheme that are unrecognizable to a human. Therefore, the natural language processing performs refines and/or updates the coding scheme in a manner that cannot be performed by the human researcher would otherwise not notice.

Particular aspects of the subject matter described in this disclosure may be implemented to realize one or more of the following potential advantages. In some examples, natural language processing improves an accuracy of a coding scheme, such that the coding scheme accurately represents a data set. Natural language processing further allows the system to recognize patterns and relationships within the data set or coding scheme that a researcher would otherwise not notice.

FIG. 1 is a block diagram illustrating a software architecture 100 that may modularize artificial intelligence (AI) functions for labeling data, according to aspects of the present disclosure. Using the architecture, a controller application 102 may be designed such that it may cause various processing blocks of a system-on-chip (SOC) 120 (for example a central processing unit (CPU) 122, a digital signal processor (DSP) 124, a graphics processing unit (GPU) 126 and/or an network processing unit (NPU) 128) to perform supporting computations during run-time operation of the controller application 102.

The controller application 102 may be configured to call functions defined in a user space 104 that may, for example, provide concepts related to a word in a candidate coding scheme. The controller application 102 may make a request to compile program code associated with a library defined in label set evaluator application programming interface (API) 106 to perform evaluation or development of a coding scheme. This request may ultimately rely on the output of a clustering neural network configured to find related concepts in data.

A run-time engine 108, which may be compiled code of a runtime framework, may be further accessible to the controller application 102. The controller application 102 may cause the run-time engine 108, for example, to take actions to change, or suggest changes to, a coding scheme. When a related concept satisfies a label updating condition, 108 may in turn send a signal to an operating system 110, such as a Linux Kernel 112, running on the SOC 120. The operating system 110, in turn, may cause a computation to be performed on the CPU 122, the DSP 124, the GPU 126, the NPU 128, or some combination thereof. The CPU 122 may be accessed directly by the operating system 110, and other processing blocks may be accessed through a driver, such as drivers 114-118 for the DSP 124, for the GPU 126, or for the NPU 128. In the illustrated example, the neural network may be configured to run on a combination of processing blocks, such as the CPU 122 and the GPU 126, or may be run on the NPU 128, if present.

Figure 2:
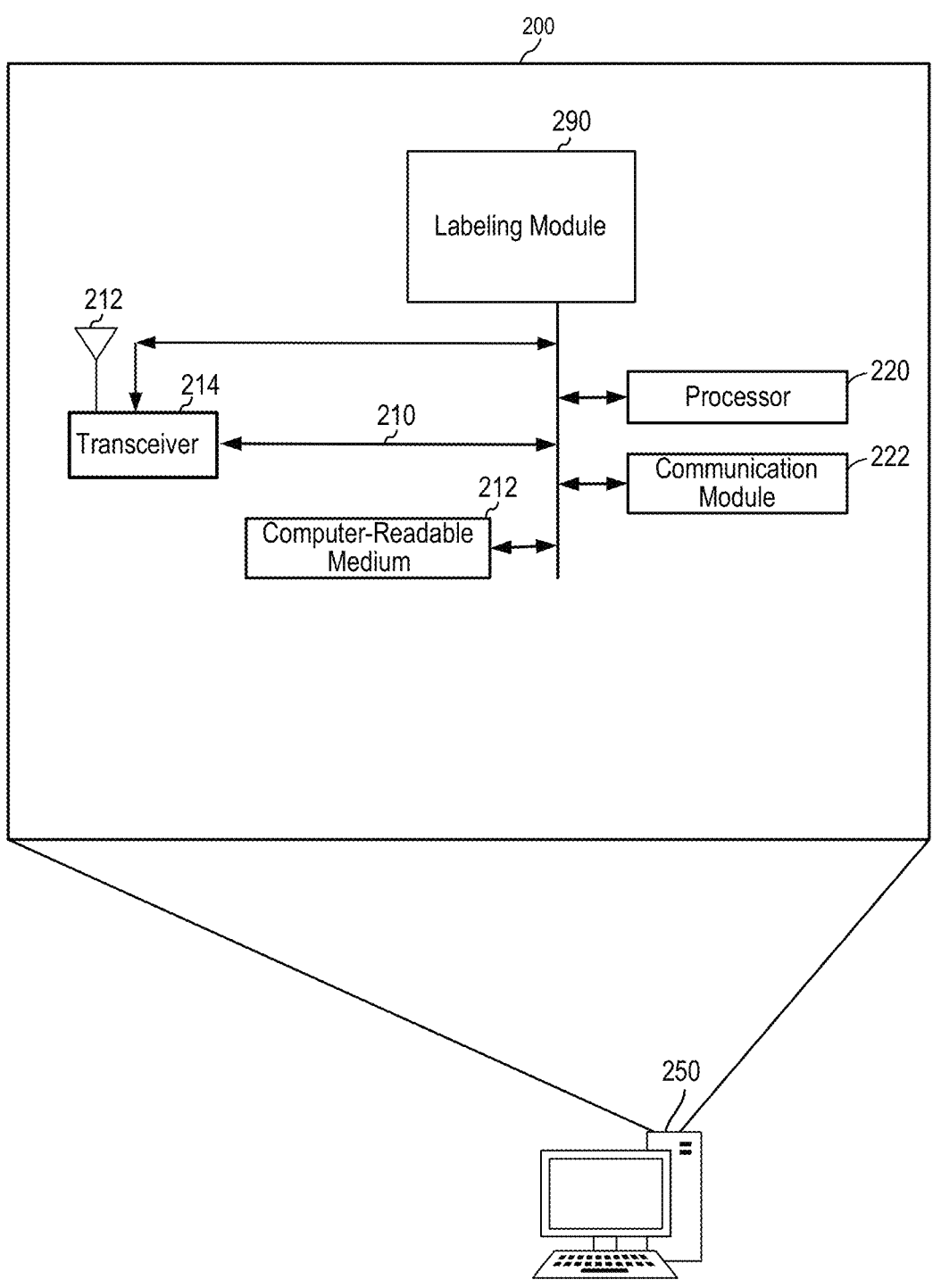
FIG. 2 is a diagram illustrating an example of a hardware implementation for a labeling system, in accordance with various aspects of the present disclosure.

FIG. 2 is a diagram illustrating an example of a hardware implementation for a labeling system 200, according to aspects of the present disclosure. The labeling system 200 may be a component of a computing device 250. In the example of FIG. 2, the labeling system may include a labeling module 290. In some examples, labeling module 290 is configured to perform operations, including operations of the process for suggesting changes to a coding scheme described with reference to FIGS. 3 and 4. The labeling module 290 may implement the software architecture 100 described with reference to FIG. 1. In some examples, the labeling system 200 is a machine learning model that is specifically trained to perform one or more step of the process 300, 400, and 500 described with respect to FIGS. 3-5, respectively.

The labeling system 200 may be implemented with a bus architecture, represented generally by a bus 230. The bus 230 may include any number of interconnecting buses and bridges depending on the specific application of the labeling system 200 and the overall design constraints. The bus 230 links together various circuits including one or more processors and/or hardware modules, represented by a processor 220, and a communication module 222. The bus 230 may also link various other circuits such as timing sources, peripherals, voltage regulators, and power management circuits, which are well known in the art, and therefore, will not be described any further.

The labeling system 200 includes a transceiver 214 coupled to the processor 220, the communication module 222, and the computer-readable medium 213. The transceiver 214 is coupled to an antenna 233. The transceiver 214 communicates with various other devices over a transmission medium. For example, the transceiver 214 may receive commands via transmissions from a user or a remote device.

In one or more arrangements, one or more of the modules 213, 214, 220, 222, 290, can include artificial or computational intelligence elements, such as, neural network, fuzzy logic or other machine learning algorithms. Further, in one or more arrangements, one or more of the modules 213, 214, 220, 222, 290 can be distributed among multiple modules 213, 214, 220, 222, 290 described herein. In one or more arrangements, two or more of the modules 213, 214, 220, 222, 290 of the labeling system 200 can be combined into a single module.

The labeling system 200 includes the processor 220 coupled to the computer-readable medium 213. The processor 220 performs processing, including the execution of software stored on the computer-readable medium 213 providing functionality according to the disclosure. The software, when executed by the processor 220, causes the labeling system 200 to perform the various functions described for a particular device, such as any of the modules 213, 214, 220, 222, 290. The computer-readable medium 213 may also be used for storing data that is manipulated by the processor 220 when executing the software.

The labeling module 290 may be in communication with the transceiver 214, the processor 220, the communication module 222, and the computer-readable medium 313. In some examples, the labeling system 200 may be implemented as a machine learning model to implement one or more elements of a process, such as the process 300, 400, and 500 described with respect to FIGS. 3-5, respectively. Working in conjunction with one or more modules 213, 214, 220, 222, 290, the labeling module 290 may generate multiple sets of related initial labels based on processing the data set with a group of initial labels via a natural language processing model. Each set of related initial labels from the multiple sets of related initial labels may be associated with a respective initial label of the group of initial labels. The labeling module 290 may further to determine a quantity of occurrences, within the data set, of each one of the group of initial labels and each related initial label of the multiple sets of related initial labels based on processing the data set with a diction evaluator model. The labeling module 290 may still further determine, for each initial label of the group of initial labels, a breadth score based on the number of occurrences of each related initial label in the set of related initial labels associated with the respective initial label. The labeling module 290 may also update one or more of the group of initial labels based on the respective breadth scores satisfying a label updating condition. The labeling module 290 may label the data set based on the updated group of initial labels and the multiple sets of related initial labels.

A coding scheme may be an example of a set of labels that are curated to tag a data set. The data set may be tagged to identify one or more prevalent themes within the data set. In some examples, the data set may include textual responses, such as transcripts or free-response survey answers. As discussed, some labels in a given coding scheme may be broad or narrow with respect to the concepts that are to be encoded.

Various aspects of the present disclosure may apply natural language processing to analyze and/or update a coding scheme. The analysis may determine whether one or more labels in a given coding scheme are broad and/or narrow with respect to the concepts each is meant to encode. The present disclosure also provides a system for suggesting labels for the coding scheme such that the labels in the coding scheme may be associated with similarly weighted granularities or conceptual spaces, such that the granularities are represented with maximally unambiguous tag names to help users establish clear mental models when coding.

In some aspects, a coding scheme for a data set may be developed by a human or trained model. The model may be a machine learning model, or another type of artificial intelligence model, trained to generate the coding scheme. In some examples, the coding scheme may include a group of labels for coding the data set. In particular, a labeling model may review the data set and assign a label from the coding scheme to one or more elements (e.g., text) of the data set. In some examples, natural language processing may be used to analyze the coding scheme and update to one or more labels of the coding scheme.

Figure 3:
FIG. 3 is a flow diagram describing an example of a process for labeling data, in accordance with various aspects of the present disclosure.
Figure 3:
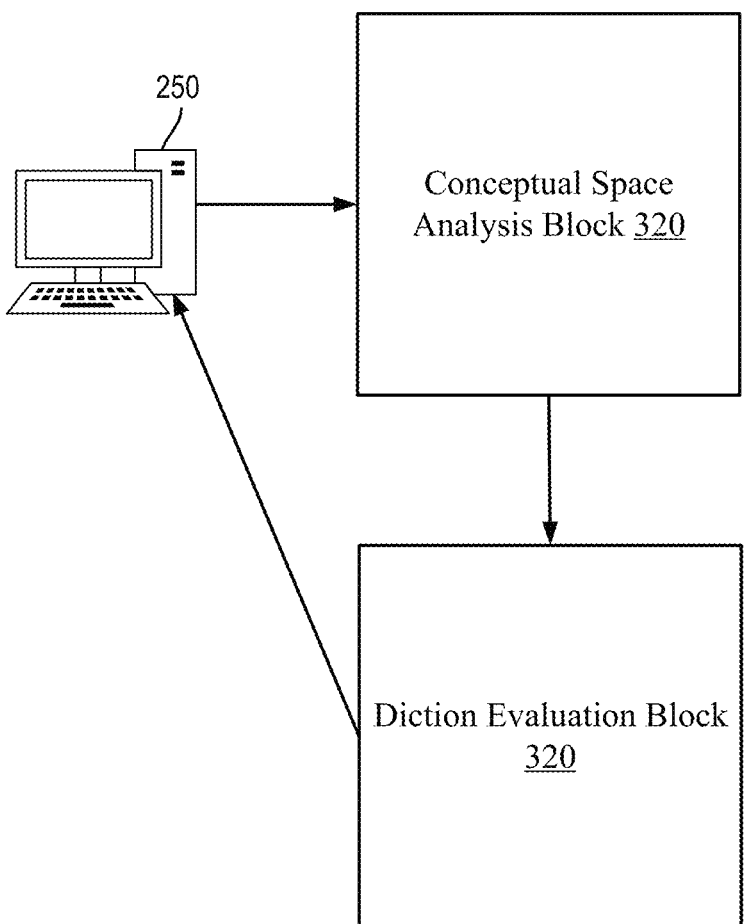

FIG. 3 is a flow diagram describing an example of a process 300 for labeling data, in accordance with various aspects of the present disclosure. The process 300 may be performed by a labeling system, such as the labeling system 200 implemented via a computing system 250 described with reference to FIG. 2. As shown in the example of FIG. 3, the process 300 may include a conceptual space analysis block 320 and a diction evaluation block 330. At block 320, a conceptual space analyzer may determine a breadth of representation of labels in a coding scheme. In some examples, the conceptual space analyzer may identify broad labels and/or narrow labels. Broad labels may represent a large set of concepts and narrow labels may represent a smaller subset of concepts. Additionally, or alternatively, in some examples, the conceptual space analyzer may determine whether labels are weighted unequally within the same scheme. In such examples, the conceptual space analyzer may reorganize the labels hierarchically and reassign weights for downstream hierarchical analyses. Additionally, or alternatively, in some examples, for one or more labels, the conceptual space analyzer may compare a conceptual space and/or determine one or more of a conceptual breadth, a conceptual density, or a conceptual overlap.

In some examples, the conceptual space analyzer may determine the conceptual breadth of a main concept in a coding scheme based on a number of hits returned for each sub-concept (e.g., label), associated with the main concept, from the data set. A hit refers to a number of instances in which the sub-concept was applied to the data set (e.g., a number of times the label was returned after the data set was processed by the coding scheme). For example, a number of hits for the sub-concept may be two if the sub-concept is applied to two different portions of the data set. The number of hits may also be referred to as a count of the sub-concept.

In some examples, the conceptual space analyzer may determine a conceptual density based on a number of hits associated with each sub-concept (e.g., label) in the coding scheme. For ease of explanation, the sub-concepts will be referred to as labels in these examples. In such examples, labels that satisfy a first density condition may be categorized into a miscellaneous category and labels that satisfy a second density condition may be differentiated from other labels in the coding scheme. The first density condition may be satisfied if the number of hits of the label is less than a threshold. Additionally, the second density condition may be satisfied if the number of hits of the label is greater than or equal to the threshold. For example, a coding scheme may be specified to label car colors for a group of cars. In this example, a number of gray cars may be greater than cars of other colors. Additionally, one car may be orange. Therefore, in this example, one or more labels associated with the color gray may be differentiated as being prevalent labels because a large quantity of vehicles are gray. In such examples, a label associated with orange may be categorized as being miscellaneous because only one car is orange.

In some examples, the conceptual space analyzer may determine a conceptual overlap based on an extent to which conceptual spaces associated with respective labels in the coding scheme overlap. The overlap may be used to determine hierarchical relevance. For example, in a coding scheme for a data set associated with barriers to battery electric vehicle (BEV) adoption, a potential label associated with "upfront costs" may always overlap with a label associated with "costs," therefore, the conceptual space analyzer may generate a hierarchy where "upfront costs" is a sub-concept to "costs."

The conceptual space comparer may use the conceptual breadth, conceptual density, and/or the conceptual overlap to compare the breadth and overlap of the labels of the coding scheme. Using the conceptual space comparer, the conceptual space analyzer may assign a relative value to indicate the system's suggested hierarchical tier and weight compared to the average of labels with conceptual overlap. For example, a first label may have a value of 10, corresponding to "very broad, while a second label may have a value of 1, corresponding to "very niche." Additionally, using the conceptual space comparer, the conceptual space analyzer may then compare the value of each label to the average within the scheme as a whole.

At block 330, the diction evaluator may determine whether labels in the coding scheme are sufficiently representative of their intended, underlying concepts based on one or more of a conceptual breadth, conceptual density, conceptual overlap, or conceptual comparison from the conceptual space analyzer of block 320. In some examples, based on the output from the conceptual space analyzer, the diction evaluator may determine that using a label associated with "car performance" may more sufficiently encompass underlying concepts such as speed, acceleration, power, and lag, in comparison to a label associated with "speed." The diction evaluator may use a diction model to identify one or more new labels that match a first label's intended breadth. In the previous example, the first label may be "speed" and the new label may be "car performance." The diction evaluator may select more appropriate labels in comparison to original labels generated by the labeling system.

Additionally, or alternatively, in some examples, the diction evaluator 330 may include a diction comparer that uses one or more of conceptual breadth, conceptual density, or conceptual overlap scores discussed above to identify one or more labels associated with a granularity that exceeds an average granularity. In such examples, the diction evaluator 330 may swap the one or more labels for broader/narrower synonyms that would minimize deviations.

In some examples, the process 300 may be associated with a label dashboard. The label dashboard may be an example of a user interface use to provide one or more coding schemes to the system. For example, a user may use the label dashboard to keep track of an underlying distribution of possible labels.

FIG. 4 is a diagram illustrating an example of a process 400 for generating a coding scheme by a labeling system, in accordance with various aspects of the present disclosure. The process 400 may be performed by the labeling system, such as the labeling system 200 as described with reference to FIG. 2. The example process 400 is an example of labeling a data set based on a coding scheme. As shown in FIG. 4, at block 402, the process 400 generates an initial coding scheme. In some examples, the initial coding scheme may include a group of initial labels for labeling a text corpus (e.g., data set). In some aspects, the initial coding scheme may be generated by a user based on user input. Additionally or alternatively, the labeling model associated with the labeling system may generate the initial coding scheme by evaluating the data set or based on another input. In one example, the initial coding scheme may be generated for a text corpus (e.g., data set) relating to the motivations for the adoption of battery electric vehicles (BEVs), the initial group of labels may include costs, infrastructure, and performance.

At block 404, the process 400 identifies related concepts for each label in the initial coding scheme. For example, the labeling system may take each label in the candidate coding scheme and, using word embeddings and clustering, find related concepts and/or sub-concepts based on their prevalence in the text corpus. That is, multiple sets of related initial labels may be generated based on processing the data set with the group of initial labels via a natural language processing model. Each set of related initial labels from the multiple sets of related initial labels may be associated with a respective initial label of the group of initial labels. Therefore, for the initial coding scheme (e.g., costs, infrastructure, and performance) in the candidate coding scheme, the labeling system may generate the following related concepts based on the prevalence of the related concepts in the corpus:

(a) costs: upfront costs, overtime costs, maintenance costs, and tax incentives;

(b) infrastructure: physical access; and (c) performance: speed, horsepower, acceleration, and lag time.

At block 406, the process 400 determines a hierarchy for the initial coding scheme based on identifying the related concepts. In some examples, the labeling system may determine whether the related concepts would overlap with the main concepts (e.g., main labels). In such examples, the labeling system generates a hierarchy based on whether the related concepts would overlap. In one example, the related concept "upfront costs" always overlaps with the label "costs," therefore, "costs" may be considered a main concept and "upfront costs" may be considered a sub-concept. The sub-concepts may also be referred to as potential sub-concepts. For the example of the initial coding scheme, the determined hierarchy may be as follows:

(a) costs:
        upfront costs, overtime costs, maintenance costs, and tax incentives;

(b) infrastructure:
        physical access; and (c) performance:
        speed, horsepower, acceleration, lag time.

At block 408, the process 400 may determine a prevalence of the potential sub-concepts in the text corpus. Based on the prevalence, the labeling system may further refine the sub-concept space. For example, the labeling system may determine that "physical access" is associated with a same amount of text segments as its parent code, "infrastructure." Additionally, in this example, the labeling system may determine that "physical access" gets more hits in comparison to other sub-concepts with a same hierarchical level, such as "upfront costs" and "speed." Therefore, the labeling system may further refine the conceptual space a divide "physical access" to "home charging" and "public charging." Furthermore, "lag time" may be combined with "acceleration" if a number of hits of each sub-concept is less than a threshold. In such examples, the refinement of the concepts may be performed via a diction evaluator model. The updated coding scheme may be as follows:

(a) costs:
        upfront costs, overtime costs, maintenance costs, tax incentives;

(b) infrastructure:
        home charging, public charging; and (c) performance:
        speed, horsepower, acceleration.

At block 410, the process 400 determines, for each main concept of the updated coding scheme, a breadth score. The breadth score of each main concept may be based on a number of occurrences, in the text corpus, of each sub-concept associated with the main concept. For example, for the main concept "costs" the breadth score may be based on a number of occurrences of upfront costs, overtime costs, maintenance costs, and tax incentives in the text corpus. For illustrative purposes, the breadth score of the main concepts may be as follows: costs (4); infrastructure (2); and performance (3).

At block 412, the process 400 selectively updates the main concepts of the initial coding scheme based on a comparison of each breadth score. That is, the main concepts may be updated if the comparative breadths are not within a range of each other. In some examples, the main concepts may be updated if the comparative breadth scores are not equal. As discussed, the comparative breadth scores of costs (4); infrastructure (2), and performance (3) are not equal. Therefore, the process 400 may suggest an alternative coding scheme, based on a previous evaluation of the concepts and sub-concepts of the initial coding scheme at blocks 402-410. In some examples, the alternative coding scheme may be: costs; charging accessibility; and driving. Furthermore, the alternative coding scheme may have the following sub-concepts and breadth scores:

(a) Costs (4):
        upfront costs, ongoing costs, maintenance costs, tax incentives;

(b) Charging accessibility (4):
        home infrastructure, public infrastructure, charging time, information needs; and (c) Driving (4):
        speed, horsepower, acceleration, regenerative braking.

In the alternative scheme, "performance" was changed by the diction evaluator model because "regenerative braking" may have yielded more hits than "performance" based on the evaluation of the initial coding scheme at blocks 402-410. In some examples, after block 412, the process 400 may return the alternative coding scheme to the user for evaluation.

FIG. 5 is a diagram illustrating an example process 500 performed in accordance with various aspects of the present disclosure. The process 500 may be performed by a labeling system, such as the labeling system 200 as described with reference to FIG. 2. The example process 500 is an example of generating a coding scheme. At block 502, the process 500 generates multiple sets of related initial labels based on processing the data set with a group of initial labels via a natural language processing model. The natural language processing model may be a trained artificial intelligence model (e.g., machine learning mode). The group of initial labels may be generated via a labeling model (e.g., a trained artificial intelligence model). In some examples, each set of related initial labels from the multiple sets of related initial labels may associated with a respective initial label of the group of initial labels. In some such examples, the process 500 generates a hierarchy between each initial label of the group of initial labels and the set of related initial labels associated with the respective initial label.

At block 504, the process 500 determines a quantity of occurrences, within the data set, of each one of the group of initial labels and each related initial label of the multiple sets of related initial labels based on processing the data set with a diction evaluator model. In some examples, a related initial label in the multiple sets of related initial labels may be updated based on the related initial label satisfying a relevance condition. In such examples, the related initial label satisfies the relevance condition based on the quantity of occurrences of the related initial label being greater than a first occurrence threshold or less than a second occurrence threshold. The process for updating the related initial includes replacing the related initial label with two or more new related initial labels based on the quantity of occurrences of the related initial label being greater than the first occurrence threshold. Alternatively, the process for updating the related initial includes combining the related initial label with another related initial label in an associated set of related initial labels based on the quantity of occurrences of the related initial label being less than the second occurrence threshold.

At block 506, the process 500 determines, for each initial label of the group of initial labels, a breadth score based on the number of occurrences of each related initial label in the set of related initial labels associated with the respective initial label. At block 508, the process 500 updates one or more of the group of initial labels based on the respective breadth scores satisfying a label updating condition. In some examples, the label updating condition may be satisfied based on the breadth score of the initial label being less than the breadth score of another initial label, within the group of initial labels, associated with a greatest number of occurrences. At block 510, the process 500 labels the data set based on the updated group of initial labels and the multiple sets of related initial labels.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for labeling a data set, comprising:
generating, via a labeling model, a group of initial labels for the data set based on identifying a set of themes associated with the data set, the labeling model being a trained artificial intelligence model;
identifying, in the data set via a natural language processing model, concepts and/or sub-concepts corresponding to each initial label of the group of initial labels, the concepts and/or sub-concepts being identified based on word embeddings that are unrecognizable to a human;
generating, for each initial label of the group of initial labels, a set of related initial labels corresponding to the concepts and/or sub-concepts identified via the natural language processing model;
determining, for each initial label of the group of initial labels, a breadth score based on a number of occurrences, within the data set, of each related initial label in the set of related initial labels associated with the respective initial label;
updating one or more of the group of initial labels based on the respective breadth scores satisfying a label updating condition; and
labeling the data set based on the updated group of initial labels and the set of related initial labels.

2. The method of claim 1, further comprising updating a related initial label in the multiple sets of related initial labels based on the related initial label satisfying a relevance condition.

3. The method of claim 2, wherein the related initial label satisfies the relevance condition based on the quantity of occurrences of the related initial label being greater than a first occurrence threshold or less than a second occurrence threshold.

4. The method of claim 3, wherein updating the related initial label comprises:
replacing the related initial label with two or more new related initial labels based on the quantity of occurrences of the related initial label being greater than the first occurrence threshold; or
combining the related initial label with another related initial label in an associated set of related initial labels based on the quantity of occurrences of the related initial label being less than the second occurrence threshold.

5. The method of claim 1, wherein the initial label satisfies the label updating condition based on the breadth score of the initial label being less than the breadth score of another initial label, within the group of initial labels, associated with a greatest number of occurrences.

6. The method of claim 1, further comprising generating a hierarchy between each initial label of the group of initial labels and the set of related initial labels associated with the respective initial label.

7. The method of claim 1, further comprising generating the group of initial labels via a labeling model.

8. An apparatus for labeling a data set, comprising:
at least one processor; and
at least one memory coupled with the at least one processor and storing instructions operable, when executed by the at least one processor, to cause the apparatus to:
generate, via a labeling model, a group of initial labels for the data set based on identifying a set of themes associated with the data set, the labeling model being a trained artificial intelligence model;

identify, in the data set via a natural language processing model, concepts and/or sub-concepts corresponding to each initial label of the group of initial labels, the concepts and/or sub-concepts being identified based on word embeddings that are unrecognizable to a human;

generate, for each initial label of the group of initial labels, a set of related initial labels corresponding to the concepts and/or sub-concepts identified via the natural language processing model;

determine, for each initial label of the group of initial labels, a breadth score based on a number of occurrences, within the data set, of each related initial label in the set of related initial labels associated with the respective initial label;

update one or more of the group of initial labels based on the respective breadth scores satisfying a label updating condition; and label the data set based on the updated group of initial labels and the set of related initial labels.

9. The apparatus of claim 8, wherein execution of the instructions further cause the apparatus to update a related initial label in the multiple sets of related initial labels based on the related initial label satisfying a relevance condition.

10. The apparatus of claim 9, wherein the related initial label satisfies the relevance condition based on the quantity of occurrences of the related initial label being greater than a first occurrence threshold or less than a second occurrence threshold.

11. The apparatus of claim 10, wherein execution of the instructions to update the related initial label further cause the apparatus to:

replace the related initial label with two or more new related initial labels based on the quantity of occurrences of the related initial label being greater than the first occurrence threshold; or combine the related initial label with another related initial label in an associated set of related initial labels based on the quantity of occurrences of the related initial label being less than the second occurrence threshold.

12. The apparatus of claim 8, wherein the initial label satisfies the label updating condition based on the breadth score of the initial label being less than the breadth score of another initial label, within the group of initial labels, associated with a greatest number of occurrences.

13. The apparatus of claim 8, wherein execution of the instructions further cause the apparatus to generate a hierarchy between each initial label of the group of initial labels and the set of related initial labels associated with the respective initial label.

14. The apparatus of claim 8, wherein execution of the instructions further cause the apparatus to generate the group of initial labels via a labeling model.

15. A non-transitory computer-readable medium having program code recorded thereon for labeling a data set, the program code executed by a processor and comprising:

program code to generate, via a labeling model, a group of initial labels for the data set based on identifying a set of themes associated with the data set, the labeling model being a trained artificial intelligence model;

program code to identify, in the data set via a natural language processing model, concepts and/or sub-concepts corresponding to each initial label of the group of initial labels, the concepts and/or sub-concepts being identified based on word embeddings that are unrecognizable to a human;

program code to generate, for each initial label of the group of initial labels, a set of related initial labels corresponding to the concepts and/or sub-concepts identified via the natural language processing model;

program code to determine, for each initial label of the group of initial labels, a breadth score based on a number of occurrences, within the data set, of each related initial label in the set of related initial labels associated with the respective initial label; and program code to label the data set based on the updated group of initial labels and the set of related initial labels.

16. The non-transitory computer-readable medium of claim 15, wherein the program code further comprises program code to update a related initial label in the multiple sets of related initial labels based on the related initial label satisfying a relevance condition.

17. The non-transitory computer-readable medium of claim 16, wherein the related initial label satisfies the relevance condition based on the quantity of occurrences of the related initial label being greater than a first occurrence threshold or less than a second occurrence threshold.

18. The non-transitory computer-readable medium of claim 17, wherein the program code to update the related initial label further comprises:

program code to replace the related initial label with two or more new related initial labels based on the quantity of occurrences of the related initial label being greater than the first occurrence threshold; or program code to combine the related initial label with another related initial label in an associated set of related initial labels based on the quantity of occurrences of the related initial label being less than the second occurrence threshold.

19. The non-transitory computer-readable medium of claim 15, wherein the initial label satisfies the label updating condition based on the breadth score of the initial label being less than the breadth score of another initial label, within the group of initial labels, associated with a greatest number of occurrences.

20. The non-transitory computer-readable medium of claim 15, wherein the program code further comprises program code to generate a hierarchy between each initial label of the group of initial labels and the set of related initial labels associated with the respective initial label.

* * * * *